United States Patent [19]
Greves

[11] Patent Number: 5,967,095
[45] Date of Patent: Oct. 19, 1999

[54] ILLUMINATED PET LEASH

[76] Inventor: Kenneth J. Greves, 719 Bielby Rd., Lawrenceburg, Dearborn Co., Ind. 47025

[21] Appl. No.: 09/061,730
[22] Filed: Apr. 18, 1998
[51] Int. Cl.⁶ ................................................. A01K 27/00
[52] U.S. Cl. ........................... 119/795; 119/859; 119/792
[58] Field of Search .................................... 119/859, 795, 119/797, 792, 770, 799, 796, 793

[56] References Cited

U.S. PATENT DOCUMENTS

| | | | |
|---|---|---|---|
| 3,153,745 | 10/1964 | Gurian et al. | 315/206 |
| 3,500,036 | 3/1970 | Szentveri | 362/152 |
| 3,549,878 | 12/1970 | Bailey | 240/10 |
| 3,720,918 | 3/1973 | Perl | 340/432 |
| 3,836,759 | 9/1974 | Silverman | 362/103 |
| 4,231,079 | 10/1980 | Heminover | 362/106 |
| 4,513,692 | 4/1985 | Kuhnsman | 119/799 |
| 4,709,307 | 11/1987 | Branom | 362/103 |
| 4,887,552 | 12/1989 | Hayden | 119/859 |
| 4,895,110 | 1/1990 | LoCascio | 119/859 |
| 4,999,753 | 3/1991 | MacKenzie | 362/234 |
| 5,046,456 | 9/1991 | Heyman et al. | 119/859 |
| 5,370,082 | 12/1994 | Wade | 119/859 |
| 5,515,247 | 5/1996 | Cheung et al. | 362/84 |
| 5,535,106 | 7/1996 | Tangen | 119/859 |
| 5,558,044 | 9/1996 | Nasser, Jr. et al. | 119/796 |
| 5,630,382 | 5/1997 | Barbera et al. | 119/859 |
| 5,850,807 | 12/1998 | Keeler | 119/799 |

Primary Examiner—Michael J. Carone
Assistant Examiner—Son T. Nguyen
Attorney, Agent, or Firm—Davidson & Gribbell, LLP

[57] ABSTRACT

An illuminated pet leash is provided which includes an elongated strap having at least one side, a first end adapted for connection to a collar, and a second end forming a handle. A relatively flat and flexible light source is provided along one side of the strap for illuminating the leash. The light source is operated by a power source attached to the strap. The light source may be either permanently or releasably attached to the strap. In another embodiment, the elongated leash strap has first and second sides, and two light sources extend along both sides. In yet another embodiment, the elongated strap is round in cross-section, and the light source spirals around the circumference of the strap for the extent of the leash. In another embodiment, the illuminated pet leash includes an elongated strap having at least one side, and first and second ends. One end of the strap is attached to a handle having a grip portion and a housing portion with first and second sides. A pair of light sources are positioned on the sides of the housing, and are electrically connected to a power source to illuminate the handle. The pair of light sources are either attached directly to the handle, or to a cover that is attached to the handle. The light sources on the handle or cover are formed in a variety of patterns such as circular, spiral or zig-zag.

6 Claims, 5 Drawing Sheets

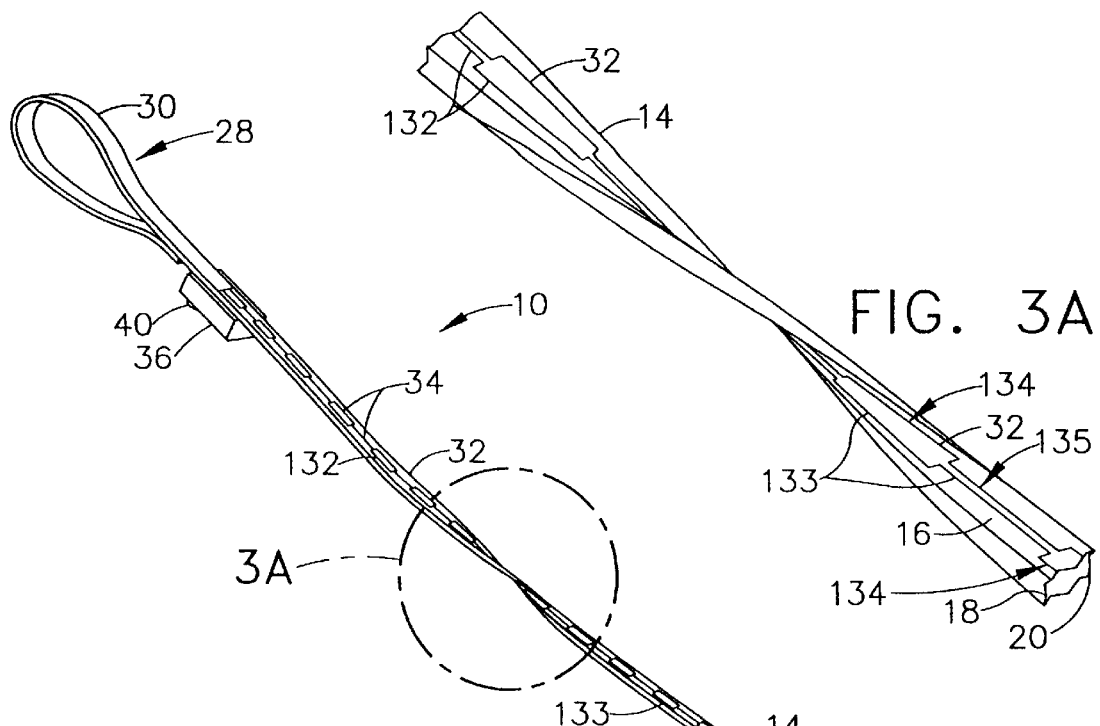
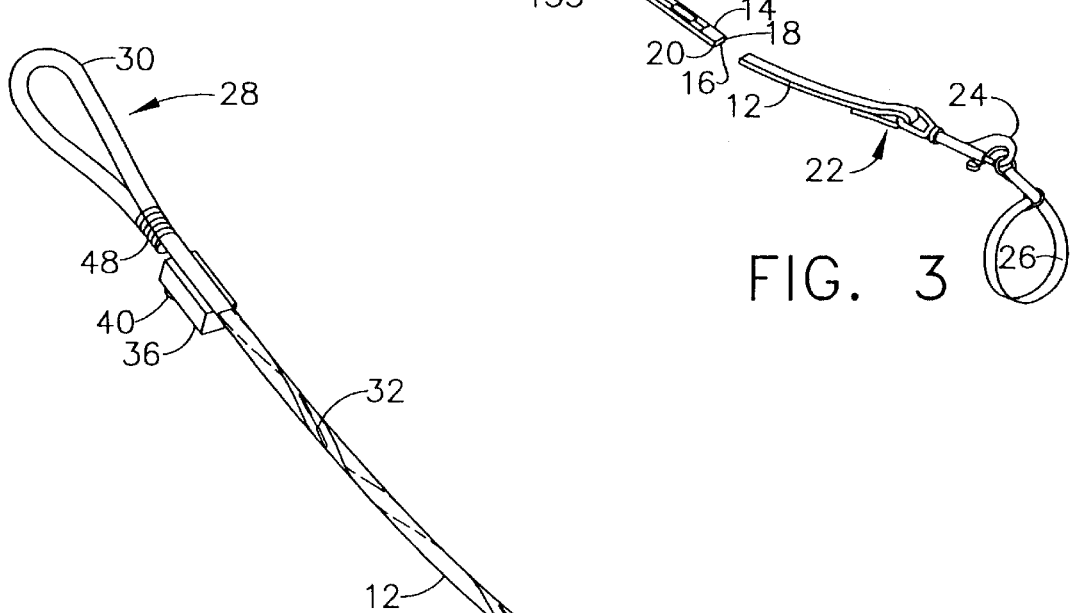
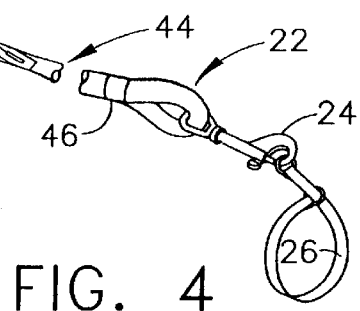
FIG. 3A
FIG. 3
FIG. 4

ILLUMINATED PET LEASH

TECHNICAL FIELD

The present invention relates generally to a pet restraint apparatus, and is particularly directed to a pet leash of the type which includes a light source for increasing the visibility of the leash at night. The invention is specifically disclosed as a pet leash that includes an elongated strip of electroluminescent material either along the leash strap or on the leash handle for illuminating the leash at night.

BACKGROUND OF THE INVENTION

Various types of pet accessories, such as collars and leashes, have been available for many years for attaching identification to a pet animal or restraining the animal during a walk. A number of different techniques have been utilized in producing these accessories in order to increase the ornamentation, functionality and/or safety of the device. One technique in particular that has been used to increase the safety as well as ornamentation of these devices is illumination.

A number of different types of illuminated dog collars are known in the art. For example, U.S. Pat. No. 5,630,382, issued to Barbera et al., discloses an illuminated pet harness having straps with internal cavities that contain fiber optic cores. A plurality of lenses are provided on a top layer of the straps for projecting light when the fiber optic core is illuminated by a light bulb. U.S. Pat. No. 5,535,106, issued to Tangen, discloses a lighted animal collar that includes a plurality of separate light emitting assemblies or housings at spaced intervals along the collar. Each of the assemblies includes a light emitting diode, battery source, reflectors and a translucent cover. U.S. Pat. No. 5,370,082, issued to Wade, discloses an animal collar that includes illuminating devices such as light emitting diodes, liquid quartz strips or electric lamps. A plurality of solar cells are provided on the outside of the collar for recharging a power supply for the illuminating devices. U.S. Pat. No. 5,046,456, issued to Heyman et al., discloses an illuminated pet collar in which multiple lights are mounted within a flexible, light-permeable tube that extends about the perimeter of the collar. A housing mounted on one end of the tube contains a circuit and a battery for operating the lights. U.S. Pat. No. 4,895,110, issued to LoCascio, discloses a pet collar that includes a light source and a power source attached to a strap. A closure device for the collar acts as a switch, such that power is provided to the light source to illuminate the collar when the ends of the collar are connected by the closure device.

In addition to illuminated pet collars, several types of illuminated pet leashes are known in the art. For example, U.S. Pat. No. 4,513,692, issued to Kuhnsman et al., discloses an illuminated pet leash comprising a non-opaque tube that contains one or more bundles of optical fibers. A light bulb is connected adjacent to the leash handle to shine light into the tube and illuminate the optical fibers in the tube. U.S. Pat. No. 4,887,552, issued to Hayden, discloses an electrically lighted pet leash that is composed of a transparent, flexible tube containing a string of small electric light bulbs mounted in parallel between two insulated wires. The leash is looped at one end to form a choker collar and at a second end to form a handle. The string of lights extends throughout the leash to illuminate both the collar and the handle. A small rechargeable battery is mounted adjacent to the handle for operating the lights.

Along with illuminated leash straps and collars, it is known in the art to illuminate the handle portion of a leash. For example, U.S. Pat. No. 5,558,044, issued to Nasser, Jr. et al., discloses illuminating a leash handle with a flashlight. The flashlight is attached to the top portion of the handle, in a forward-facing direction, such that the light beam from the flashlight can be pointed in any desired direction by the hand holding the leash.

While the conventional leashes and collars disclosed in the above patents all include light sources for increasing the visibility of the device at night, they suffer from a number of drawbacks. For instance, while the conventional illuminated collars increase the safety of a pet at night by increasing its visibility, this illumination is limited to the neck of the animal and, thus, does not provide increased visibility for the pet's owner. Moreover, while the conventional illuminated dog leashes do provide this increased visibility for the pet's owner, each of these leashes relies upon incandescent bulbs for illumination, which require a relatively high power level for the amount of light produced, and also generate heat which is undesirable in a pet leash. Further, each of the conventional illuminated leashes is comprised of a transparent tube, rather than a thin strap of material and, thus, is not as flexible as more conventional, non-illuminated leashes.

Accordingly, it is desirable to have an illuminated pet leash that increases the visibility of both a pet and its owner, and which includes a flexible, low-power, non-incandescent light source that can be manufactured as part of the leash strap or handle, or provided as an attachment for an existing leash strap or handle.

SUMMARY OF THE INVENTION

Accordingly, it is a primary object of the present invention to provide an illuminated pet leash that generates a strip of light from a flat and flexible light source.

It is another object of the present invention to provide an illuminated pet leash that is more visible and flexible than prior illuminated leash designs.

It is a further object of the present invention to provide an illuminated pet leash in which the light source is detachable from either the leash strap or handle.

It is yet another object of the present invention to provide an illuminated pet leash in which the illumination is generated by a low-power light source.

It is yet a further object of the present invention to provide an illuminated handle for a retractable pet leash.

Additional objects, advantages and other novel features of the invention will be set forth in part in the description that follows, and in part will become apparent to those skilled in the art upon examination of the following or may be learned with the practice of the invention.

To achieve the foregoing and other objects, and in accordance with one aspect of the present invention, an improved illuminated pet leash is provided which includes an elongated strap having at least one side, a first end adapted for connection to a collar, and a second end forming a handle. An elongated, relatively flat and flexible light source is provided along one side of the strap for illuminating the leash. The light source is operated by a power source that is attached adjacent to one end of the strap. In one embodiment, the light source may be incorporated into a side of the strap, such that the light source is permanently attached to the strap. In an alternative embodiment, the light source may be releasably attached to one side of the strap by a plurality of fasteners, such as hook and pile type fasteners.

In another aspect of the invention, the elongated leash strap has front and back surfaces, with light sources extending substantially along both the front and back surfaces to illuminate opposing sides of the leash. The light sources on the two sides of the leash are either incorporated into the surfaces of the strap so as to be a permanent part of the leash, or are releasably attached to the two sides by a plurality of fasteners.

In yet another aspect of the invention, the elongated leash strap has a round cross-section, and the relatively flat and flexible elongated light source spirals around the circumference of the strap, substantially along the length of the leash.

In a further aspect of the invention, the illuminated pet leash includes an elongated strap having at least one relatively flat surface, and first and second ends. The first end of the strap is attachable to a connector for releasably attaching the leash to a collar, and the second end of the strap is attached to a handle. The handle includes a grip portion and a housing portion having first and second relatively flat sides. A pair of light sources are positioned on the first and second sides of the housing portion, and are electrically connected to a power source such that the light sources illuminate the sides of the handle. In accordance with this aspect of the invention, the pair of light sources are either incorporated into the sides of the handle, or into a cover that can be releasably attached about the handle, such that the light sources incorporated in the cover are positioned substantially over the first and second sides of the handle. The cover may be attached to the handle by any of a number of different types of fasteners such as hook and pile type fasteners, or pressure sensitive glue. The light sources on the handle or cover may be formed in a variety of patterns such as circular, spiral or zig-zag patterns.

Still other objects of the present invention will become apparent to those skilled in this art from the following description and drawings wherein there is described and shown preferred embodiments of this invention in several of the best modes contemplated for carrying out the invention. As will be realized, the invention is capable of other different embodiments, and its several details are capable of modification in various, obvious aspects all without departing from the invention. Accordingly, the drawings and descriptions should be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 3 is a perspective view of a third embodiment of the illuminated pet leash of the present invention.

FIG. 3A is an enlarged, perspective view of the area indicated in FIG. 3, depicting the indicated portion of the leash in greater detail.

FIG. 4 is a perspective view of a fourth embodiment of the illuminated pet leash of the present invention.

DETAILED DESCRIPTION OF THE PREFERRED EMBODIMENTS

Reference will now be made in detail to the present preferred embodiments of the invention, examples of which are illustrated in the accompanying drawings, wherein like numerals indicate the same elements throughout the views.

Figure 1:
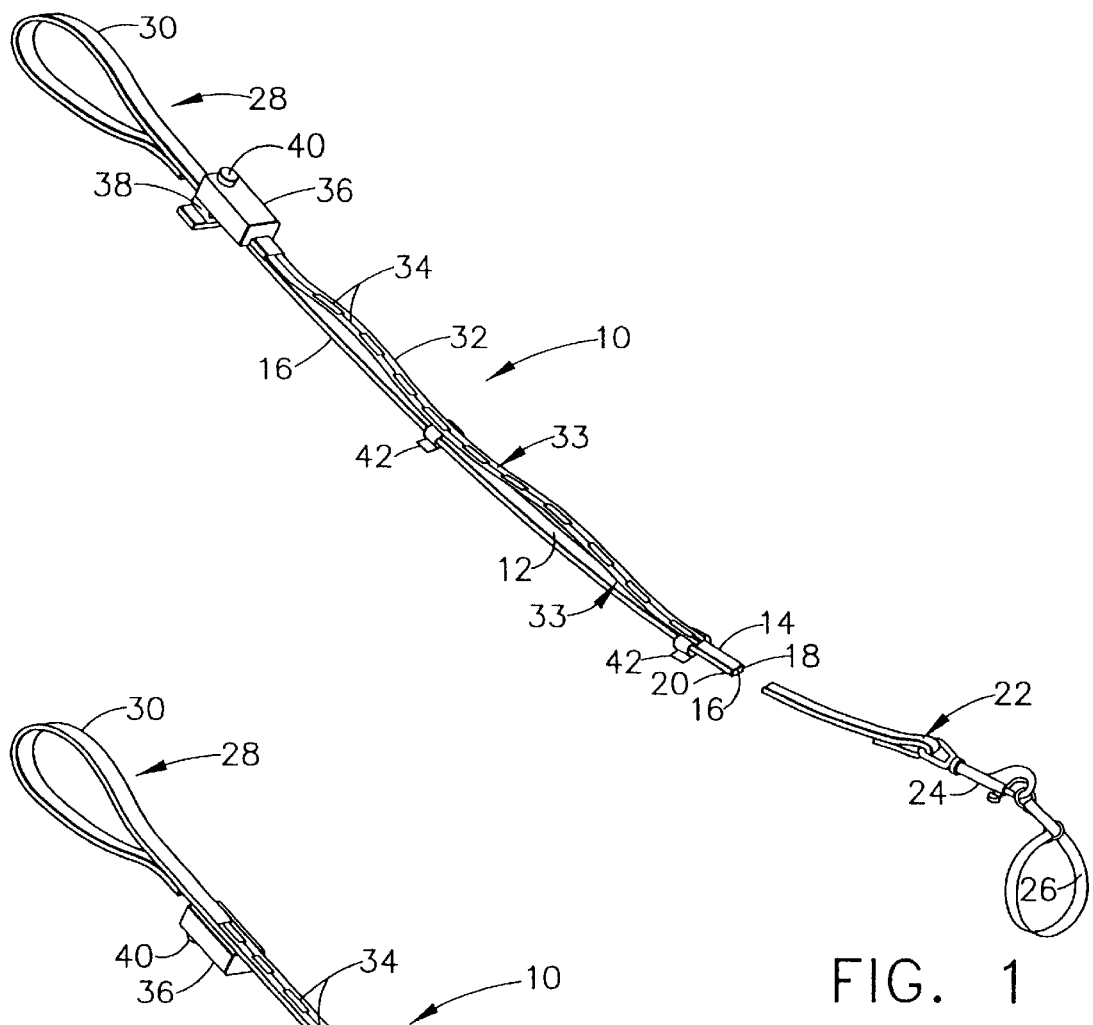
FIG. 1 is a perspective view of a first embodiment of an illuminated pet leash, as constructed according to the principles of the present invention.

Referring now to the drawings, FIG. 1 shows a pet leash, generally designated by the reference numeral 10. The pet leash 10 includes an elongated strap 12 which may be comprised of leather, plastic, nylon or any other suitable material having sufficient length, flexibility and strength for use as a pet leash. In the embodiment shown in FIG. 1, the strap 12 has a rectangular cross-section with substantially planar surfaces at a first side 14 and a second side 16, along with edges 18, 20.

A first end 22 of the strap 12 is looped through a connector 24 and attached back against the strap 12 in order to secure the connector to the strap. The end 22 of the strap may be secured against a side of the strap 12 by any means suitable for use with the selected strap material. The connector 24 may be any type of connector suitable for releasably connecting the leash 10 to a collar, harness or other similar restraining device, such as the choke collar 26 shown in FIGS. 1–4. A second end 28 of the strap 12 is looped back and attached against a side of the strap to form a handle 30. While FIGS. 1–4 depict the handle 30 as a hand loop, it is to be understood that any other suitable type of handle that would enable the leash to be held in a user's hand could be used in place of the hand loop without departing from the scope of the present invention.

Figure 2:
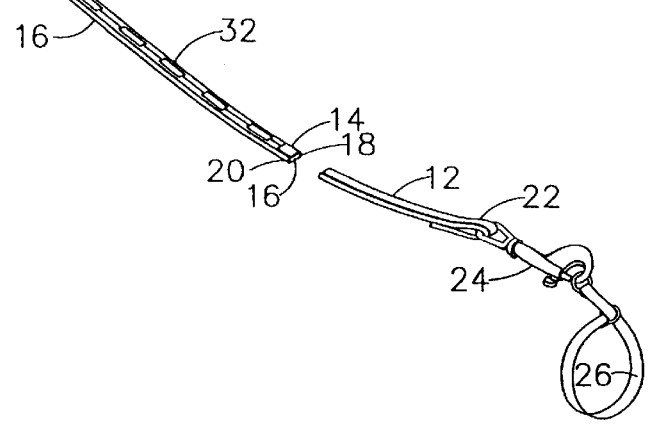
FIG. 2 is a perspective view of a second embodiment of the illuminated pet leash of the present invention.

In the embodiments shown in FIGS. 1 and 2, a relatively flat and flexible light source 32 extends between the first and second ends 22, 28 substantially along one side of the strap 12 to illuminate the strap. The light source preferably comprises a strip of electroluminescent (EL) material, such as, for example, the K Series EL lamp configuration manufactured by BKL Inc. of King of Prussia, Pa. The EL strip 32 is thin, flexible and lightweight, and conforms easily to the shape of the strap 12 without adding considerably to the weight of the strap. In addition, the EL strip 32 remains cool to the touch while the light source is energized and, thus, does not create a heat source on the leash 10.

A plastic coating may be applied to the surfaces of the EL strip 32 in order to electrically insulate and protect the strip from moisture. Alternatively, the EL strip 32 may be encapsulated between layers of plastic 33, such as shown in FIG. 1, to insulate and protect the material. This encapsulation is more urgently required in the illustrated embodiment of FIG. 1 (where the EL strip is detachable from the leash) than the illustrated embodiment of FIG. 2 (where the EL strip is permanently attached to the leash, and thereby is protected on at least its back side). The width of the EL strip 32 is preferably varied along the length of the strip, as indicated at 34, in order to reduce by approximately one-half the amount of power required to illuminate the strip, while maintaining a continuous electrical connection and band of light along the strip. In a representative embodiment, the width of the strip 32 alternates between 1/16 of an inch and 1/8 of an inch for the extent of the strip.

An electrical power source 36 is provided at one end of the EL strip 32, and is electrically connected to a pair of leads (not shown) associated with the strip, to illuminate the strip. The power source 36 is positioned on the strap 12 and may be either permanently attached to the strap by any suitable means, or releasably attached to the strap by a clip 38 (as shown in FIG. 1), a hook and pile type fastener such as those commonly available under the trademark VELCRO, or any other suitable type of fastener. The power source 36 may be positioned either on the first side 14 (or surface) of the strap 12, as shown in FIG. 1, or on the second side 16 (or surface) of the strap as shown in FIGS. 2 and 3, but is preferably positioned adjacent to the second, handle end 28 of the strap to enable easy operation by a user.

The power source 36 includes a battery (not shown) which in the preferred embodiments is a conventional 9 volt DC battery, and an inverter (not shown) for generating an increased, AC voltage for driving the strip of EL material in a manner known in the art. Optionally, the power source 36 also could include a timer circuit to enable the EL strip 32 to be flashed on and off in a repeatable timing cycle. A switch, shown as a push button 40, is provided on the power source 36 for connecting and disconnecting electrical power from the EL strip 32.

In the embodiment shown in FIG. 1, the EL strip 32 is attached to the first side 14 of the strap 12 by a plurality of fasteners 42. The fasteners 42 may be C-clips (such as depicted in FIG. 1), hook and pile type fasteners (such as those commonly available under the trademark VELCRO), or any other type of quick connect and disconnect fastener suitable for releasably securing the EL strip 32 to a side of the strap 12. While the EL strip 32 is shown attached to the first side 14 of the strap 12, the EL strip 32 could just as easily be attached to the second side 16 of the strap without altering the operation of the leash. The fasteners 38, 42 for the EL strip 32 and the power source 36 enable the light source to be applied as an attachment to an existing leash, or used on the leash only during certain occasions, such as nighttime use.

FIG. 2 depicts an alternative embodiment for the leash 10 of the present invention, in which the EL strip 32 is incorporated as a unitary part of the strap 12. In this embodiment, the EL strip 32 is embedded, or attached by another similar method, into one side (e.g., side 14) of the strap 12 when the leash 10 is manufactured, so that the light source is permanently attached to the strap. Similarly, in this embodiment the power source 36 for operating the EL strip 32 is permanently attached, by any suitable method, to the strap 12. Permanently attaching the EL strip 32 and power source 36 to the strap 12 eliminates the need for the fasteners 38 and 42 depicted in the embodiment of FIG. 1. Aside from the permanent attachment of the EL strip 32 and power source 36 to the strap 12, the operation of the leash 10 shown in FIG. 2 would be the same as that described with respect to the leash shown in FIG. 1.

Another alternative embodiment for the leash 10 of the present invention is depicted in FIGS. 3 and 3A. In this embodiment, a pair of EL strips 32 are applied to the strap 12, such that the strips (depicted by the reference numerals 132 and 133) extend substantially along the first and second sides 14, 16 of the strap. The EL strips 132, 133 may be embedded or otherwise suitably attached to the leash so as to form a permanent, integral part of the leash, such as shown in FIGS. 3 and 3A. Alternatively, the EL strips 132, 133 may be releasably attached to the sides 14, 16, respectively, of the strap 12 by fasteners, in a manner similar to that described with respect to FIG. 1.

FIG. 3A depicts a portion of the strap 12 where it is twisted one-half turn to show the EL strips 132, 133 on both the respective first and second sides 14, 16 of the strap. As in the previous embodiments, a power source 36 is either permanently or releasably attached to the strap 12 and electrically connected to the strips 132, 133. In this embodiment, the power source 36 is attached to a separate pair of leads (not shown) for each of the strips 132, 133 in order to supply electrical power for illuminating the strips. FIG. 3A also illustrates in greater detail the preferred shape of the EL strips 132, 133 with respect to their varying width, as related above. At reference numeral 134 the EL strip is relatively wide to provide a large surface area that emanates light when energized. At reference numeral 135, the EL strip is much more narrow in order to reduce electrical power consumption while also maintaining electrical continuity between the wider portions 134.

The leash 10 shown in FIG. 4 is yet another alternative embodiment of the present invention. In this embodiment, the strap 12 has a round cross-section, as indicated at 44. Similar to the previous embodiments, the first end 22 of the strap 12 is looped through a connector 24 and secured back against the strap by a clasp 46, while the second end 28 of the strap 12 is secured back against the strap by a second clasp 48 to form a hand loop 30. In this embodiment, the light source, which preferably comprises a single strip of EL material 32 as described above, spirals about the cylindrical surface of the strap 12 substantially along the length f the strap. The EL strip 32 is preferably integrally formed as a permanent part of the strap 12.

As in the previously described embodiments, the EL strip 32 is illuminated by a power source 36 that is preferably securely attached to the strap 12 by any type of attachment device suitable for use with the strap material. While the spiraling light source has been shown and described with respect to a strap having a round cross-section, it is to be understood that the spiraling light source could also be applied to a strap having a rectangular cross-section, as shown in FIGS. 1–3, such that the EL strip 32 spirals about the outer surfaces 14, 16, 18 and 20 of the strap substantially along the length of the strap, without departing from the scope of the invention. In such an alternative embodiment, the EL strip could be encapsulated to provide greater durability.

FIGS. 5–8 depict alternative embodiments for the present invention, in which a handle 30 of a retractable leash assembly is illuminated by a light source. In these embodiments, the handle 30 is preferably comprised of a rigid material, such as plastic. The handle 30 includes a grip portion 50 and a housing portion 52 having a first side 54 and a second side (on the far side of FIG. 5, and thus not shown) separated by an internal cavity (not shown). The leash strap 12 is stored in the internal cavity and spooled out of and retracted back into the cavity by a retracting mechanism known in the art. The grip portion 50 of the handle 30 is attached in a spaced manner to the housing 52 to provide an opening 58 through which a user's hand may be inserted to grasp the handle. A pushbutton 60 controls the retracting mechanism for the assembly. The pushbutton 60 is preferably provided on the top portion 56 of the housing 52 within easy reach of a user's thumb when the user's hand is holding onto the grip 50. The pushbutton 60 may be locked into a closed position by a lock 62.

Figure 5:
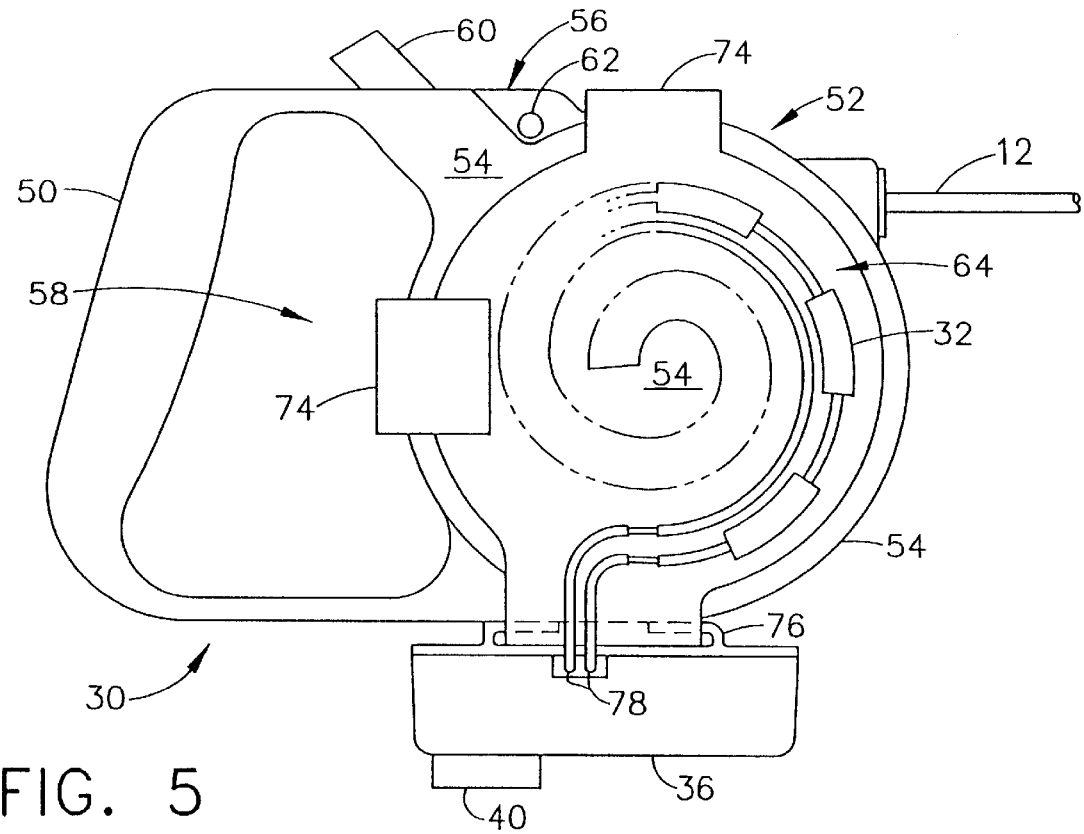
FIG. 5 is a side elevational view of an illuminated leash handle, as constructed according to the principles of the present invention.

As shown in FIG. 5, in the present embodiment a cover 64 comprising illuminating material is attached to the handle 30. Two removable versions of similar covers are depicted by the reference numerals 64 and 65, and illustrated apart from the handle 30 in FIGS. 6 and 7 as having different EL material shapes. As shown in these Figures, the covers 64, 65 include first and second sides, respectively 68, 70 and 168, 170, of similar size and shape, that cover the sides of the housing 52 when the covers are wrapped about the handle 30. The covers 64, 65 may be comprised of canvas, cloth, flexible plastic, or any other material suitable for bending about the exterior of the housing 52. Alternatively, the covers 64, 65 can be comprised of a rigid plastic material having fold lines (not shown) for bending and conforming the cover to the shape of the handle 30. The cover 64 is attached to the housing 52 by attachment tabs 74 containing any suitable type of quick connect, disconnect fastener such as, for example, hook and pile type fasteners commonly available under the trademark VELCRO. In the embodiments shown, two pairs of attachment tabs 74 attach the cover 64 to the handle 30 at the top portion 56 of the housing 52 and through the opening 58.

As mentioned above, the cover 64 includes a light source for illuminating the handle 30. In the preferred embodiments shown in the Figures, the light source comprises EL material, similar to that described with respect to the embodiments of FIGS. 1–4. The EL material preferably is permanently attached to the cover 64 by embedding the material into the cover, or attaching the material by any other method suitable to the cover material. In the embodiments shown in FIGS. 5 and 6, on one side 68 the EL material is in the form of strips 32 having alternating widths 34 as described with respect to FIGS. 1–4, and on the other side 70, the EL strips 140, 142 can be of a continuous constant width (as illustrated on FIG. 6), or could be configured with alternating widths.

Figure 6:
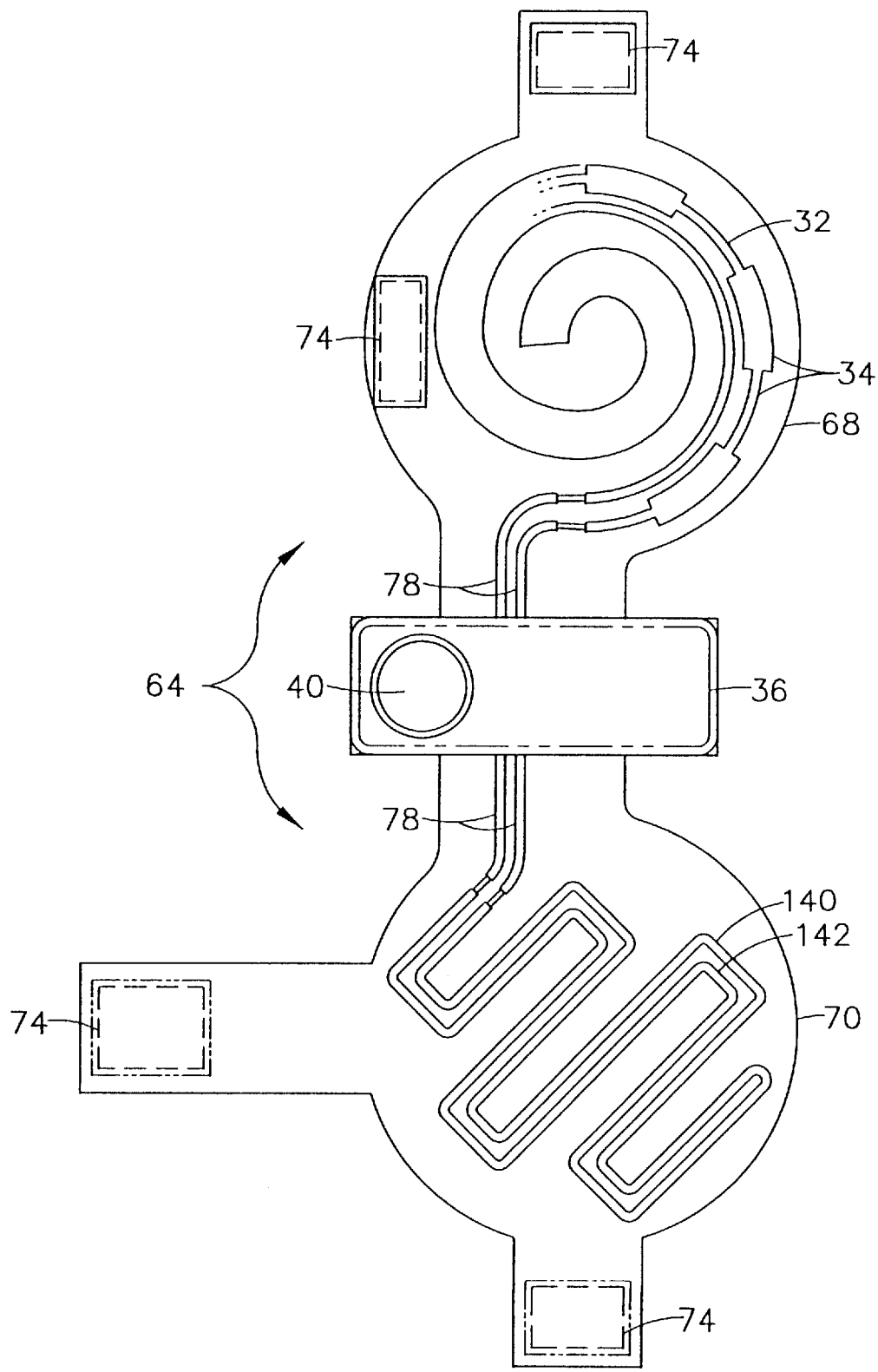
FIG. 6 is a top plan view of a representative embodiment for the leash handle cover shown in FIG. 5.

In the preferred embodiment of FIG. 6, a single EL strip is attached to each of the sides 68, 70, and shaped into any of a variety of patterns, such as the illustrated spiral and zig-zag patterns. The same EL strip pattern may be applied to each of the two sides 68, 70 of the cover 64, or the two sides may have differing patterns (as in FIG. 6) without departing from the scope of the present invention. Further, while the invention is depicted with spiral and zig-zag patterns, it is to be understood that the EL strips may be formed into any other desired pattern without departing from the scope of the invention.

An electrical power source 36, similar to that described for FIGS. 1–4, is attached to the cover 64 between the two sides 68, 70 for illuminating the EL strips 32, 140, and 142. The power source 36 may be either permanently or releasably attached to the cover 64 by any suitable method, such as by tabs 76 shown in FIG. 5. The power source 36 is electrically connected to the EL strips 32 through leads 78, for supplying power to the strips when the pushbutton 40 is in an "on" position.

Figure 7:
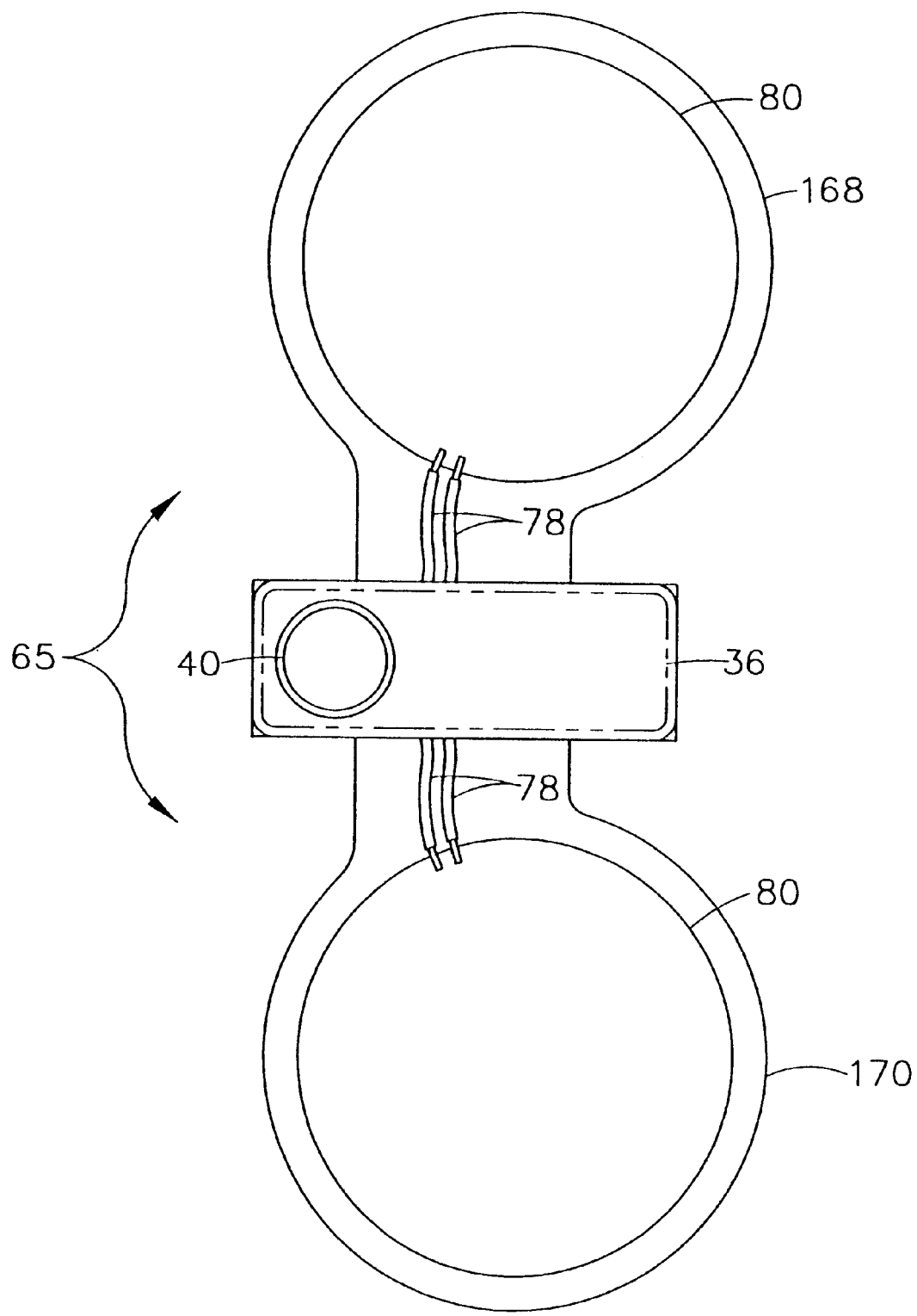
FIG. 7 is a top plan view of an alternative embodiment for the leash handle cover shown in FIG. 6.

FIG. 7 depicts an alternative embodiment cover, generally depicted by the reference numeral 65, in which the cover is illuminated by solid circles of light, rather than by strips of light. In this embodiment, a solid circle of EL material 80 is attached to each of the sides 168, 170 of the cover 65. The circles 80 preferably are permanently attached to the cover 64 by adhesives, molding or any other method suitable for the cover material. As in the previous embodiments, a power source 36 is attached to the cover 65 between the light circles 80, and electrically connected to the circles through leads 78. A pushbutton 40 on the power source 36 controls the flow of power to the circles 80. The cover 65 may be attached to the handle 30 by attachment tabs (such as tabs 74 described with respect to FIGS. 5 and 6) or, alternatively, by pressure sensitive adhesive (not shown) located on the underside of the cover. The adhesive may be located under the two sides 168, 170 such that when the cover 65 is wrapped about the housing 52, the two sides of the cover can be pressed against the housing sides to adhere the cover to the handle.

Figure 8:
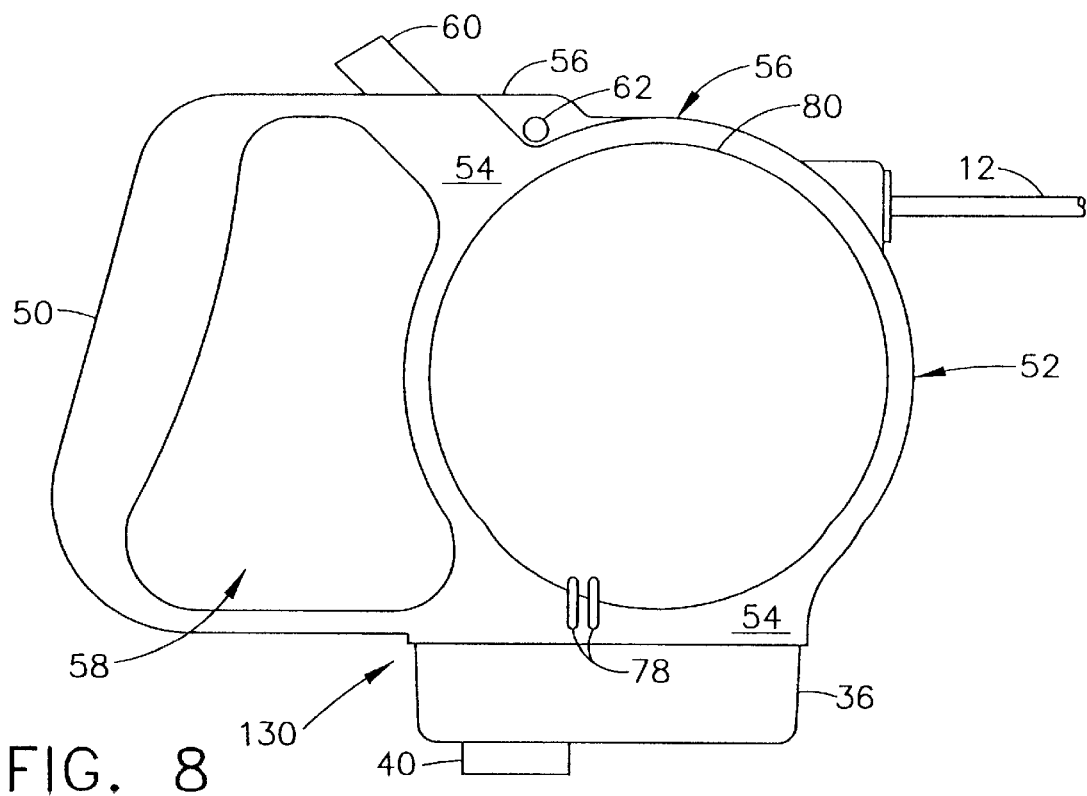
FIG. 8 is a side elevational view of an alternative embodiment for the illuminated leash handle of the present invention.

FIG. 8 depicts an alternative embodiment handle 130 (as compared to handle 30 shown in FIG. 5), in which an illuminating light source is attached directly to the handle housing 52, rather than to a cover 64 or 65. In this embodiment, the light source, which is preferably EL material as described above, as well as the power source 36 are incorporated into the handle 30 by molding or any other permanent form of attachment. Similar to the other embodiments, the power source 36 is connected to the light source by leads 78 and controlled by a push button 40. In this embodiment, the light sources may be solid circles 80 as shown or, alternatively, strips of EL material in any of a variety of patterns, such as, for example, the patterns shown in FIG. 6. Many of the other structural elements of handle 130 are virtually identical to those elements of handle 30 and, therefore, are depicted by identical reference numerals.

The foregoing description of preferred embodiments of the invention has been presented for purposes of illustration and description. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. An illuminated pet leash, comprising:

an elongated strap having at least one side, a first end adapted for connection to a collar and a second end forming a handle;

a relatively flat and flexible light source extending substantially along a portion of said at least one side of said strap;

a power source positioned on said strap and electrically connected to said light source to energize said light source; and a plurality of fasteners for releasably attaching said light source to said at least one side of said strap.

2. The illuminated pet leash of claim 1, wherein said fasteners are hook and pile type fasteners.

3. An illuminated pet leash, comprising:

an elongated strap having a first side and a second side, a first end adapted for connection to a collar and a second end forming a handle;

a relatively flat and flexible light source extending substantially along a portion of said at least one side of said strap;

a power source positioned on said strap and electrically connected to said light source to energize said light source; and wherein said relatively flat and flexible light source extends substantially along said first side, and a second relatively flat and flexible light source extends substantially along said second side.

4. An illuminated pet leash, comprising:

an elongated strap having at least one side, a first end adapted for connection to a collar and a second end forming a handle, said strap being round in cross-section;

a relatively flat and flexible light source extending substantially along a portion of said at least one side of said strap, wherein said relatively flat and flexible light source spirals about the round surface of said strap; and a power source positioned on said strap and electrically connected to said light source to energize said light source.

5. An illuminated pet leash, comprising:

an elongated strap having at least one side, a first end adapted for connection to a collar and a second end forming a handle, said strap being rectangular in cross-section;

a relatively flat and flexible light source extending substantially along a portion of said at least one side of said strap, wherein said relatively flat and flexible light source spirals about the rectangular surface of said strap; and a power source positioned on said strap and electrically connected to said light source to energize said light source.

6. An illuminated pet leash, comprising:

an elongated strap having first and second sides connected by a pair of edges, a first end adapted for connection to a collar and a second end forming a handle;

a relatively flat and flexible light source extending substantially along a portion of said at least one side of said strap, wherein said light source spirals about said first and second sides and said pair of edges longitudinally along said strap; and a power source positioned on said strap and electrically connected to said light source to energize said light source.

* * * * *